No. 782,118. PATENTED FEB. 7, 1905.
G. H. FETTUS.
APPARATUS FOR ANHYDROUSLY CONCENTRATING ORES OR THE LIKE.
APPLICATION FILED AUG. 29, 1903.

WITNESSES:
H. Biggard
A. C. Williams

INVENTOR
George H. Fettus,
BY
Walter C. Pusey
ATTORNEY

No. 782,118. PATENTED FEB. 7, 1905.
G. H. FETTUS.
APPARATUS FOR ANHYDROUSLY CONCENTRATING ORES OR THE LIKE.
APPLICATION FILED AUG. 29, 1903.

WITNESSES:

INVENTOR
George H. Fettus
BY

ATTORNEY.

No. 782,118. PATENTED FEB. 7, 1905.
G. H. FETTUS.
APPARATUS FOR ANHYDROUSLY CONCENTRATING ORES OR THE LIKE.
APPLICATION FILED AUG. 29, 1903.

WITNESSES:
H. Biggard
A. C. Williams

INVENTOR
George H. Fettus
BY Walter C. Pusey
ATTORNEY

No. 782,118.  Patented February 7, 1905.

UNITED STATES PATENT OFFICE.

GEORGE H. FETTUS, OF PHILADELPHIA, PENNSYLVANIA.

APPARATUS FOR ANHYDROUSLY CONCENTRATING ORES OR THE LIKE.

SPECIFICATION forming part of Letters Patent No. 782,118, dated February 7, 1905.

Application filed August 29, 1903. Serial No. 171,181.

*To all whom it may concern:*

Be it known that I, GEORGE H. FETTUS, a citizen of the United States, residing in the city and county of Philadelphia, in the State of Pennsylvania, have invented certain new and useful Improvements in Apparatus for Anhydrously Concentrating Ores or the Like, of which the following is a full, clear, and exact description, reference being had to the accompanying drawings, of which—

This invention is designed to obviate the difficulties heretofore encountered in the practical operation of separating and concentrating ores anhydrously on a commercial scale. It is well known that in certain portions of the United States much metal value is lost because of the incapability of separating the same from the base material, except at great expense, because of the lack of water in carrying out the usual washing processes.

My invention is adapted to separate and concentrate the metal values of the ores anhydrously, any water therein being rather a detriment than a help.

My invention consists of the adaptation in a machine of the principle that sand or other comminuted material falling from a spout to a horizontal plane will form a conical pile, and when the particles forming the said pile are in equilibrium or at rest the angle to the horizontal at the base will be between twenty-one and forty-one degrees, varying with different material.

In the embodiment of my invention I utilize a horizontally-revoluble drum into which the mass of material is continuously fed in comminuted form, said drum being provided in its periphery with interior and exterior communicating pockets to receive and discharge the material and the rotation of which will disturb the center of gravity of the mass of contained material, thereby exerting a certain force upon the particles composing the said mass, which said particles are constantly seeking equilibrium in accordance with their respective specific gravities, whereby said particles are separated into layers or strata in accordance with their specific gravities, all as hereinafter more particularly set forth.

Figures 6, 8:
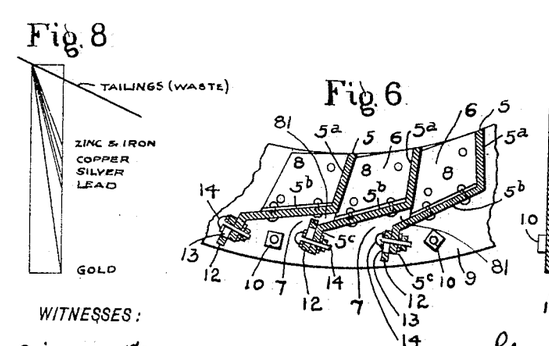
Fig. 6 is an enlarged detail in section of the inlet and discharge pockets of the drum.
Fig. 8 is a diagram showing the lines of force generated by the base material and the various metals that may be in the ore to be treated.
Figure 7:
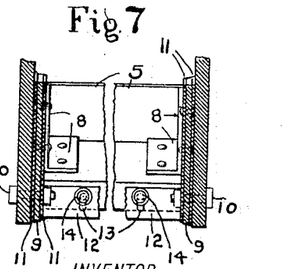
Fig. 7 is a front elevation of Fig. 6.

In the drawings, 1 is a cylindrical drum mounted on a horizontal shaft 2, rotatably journaled upon fixed standards 3. Said drum has truncated conical-shaped end portions 4, and the cylindrical portion of the periphery of the drum is composed of angular bars 5, placed at regular intervals apart and forming between each other interior and exterior pockets, (marked, respectively, 6 and 7.) For convenience of construction I fix the bars 5 to angle-bars 8, secured to flat circular bands 9, fixed to said drum ends 4 by bolts 10. Between the contact-surfaces of said bars 8 and bands 9 and also between bands 9 and the drum ends 4 are inserted circular plates of sheet-lead 11 or other soft material, so that when the bolts 10 are tightened the plates 11 will be squeezed into the inequalities of the contact-surfaces and make the connections perfectly sand-tight. The said drum-periphery bars 5 are each composed of three planes or limbs $5^a$ $5^b$ $5^c$, as shown, and the outside limb has an adjustable tongue or plate 12, provided with slots 13 and secured thereto by set-bolts 14. (See Figs. 6 and 7.) By loosening the set-bolts 14 the tongue may be adjusted to any position within the range of said slots 13. The function of said adjustable tongue or plate is to regulate the discharge from the pockets 7 to the exterior of the drum, it being manifest that the discharge may be increased by lowering said tongue and decreased by raising the same.

In the conical zones—that is, within the ends 4 of the drum 1—are fixed thereto inclined radial fins or blades 15, the function of which is to direct a portion of the particles of the upper strata at the lower end of the inclined mass of material within said ends to the central cylindrical zone of the drum, so as to increase the quantity of worthless particles in the lower end of the upper strata in the said central cylindrical zone and to carry the greater portion thereof to the highest point of the upper strata within said conical zone. The purpose of the conical portions or zones is to give lateral motion to the material within the drum and to give greater area to the surface of the mass of particles moving within the drum, the effect of which is to give a greater volume of worthless particles at the lower end or discharge end of the central zone.

The drum 1 is driven from a suitable source of power through a power-wheel 16 on a shaft 17, carrying a gear 18, which meshes with a gear 19 on the drum-carrying shaft 2.

Inclosing the lower portion of the drum 1 is a catch-basin 20, which has an inclined bottom 21, provided at its lowermost point with an exit-opening 22, adapted to be closed or opened, as may be required, by a valve 23, hereinafter more particularly referred to. Said catch-basin 20 has also two openings 24 in the inclined bottom 21 some distance above its lower end, one thereof on each side of the latter, (as said openings 24 are identical in construction, one of which is only shown on drawings,) for a purpose hereinafter appearing, and which latter openings are controlled by adjustable doors or valves 25, adjustably secured to said catch-basin bottom by set-bolts 25$^a$. The function of the opening 22 is to, when open, empty the contents of the catch-basin at the lowest point. The function of either or both of the openings 24 is twofold: first, to assist the lower opening 22 to quickly discharge the contents of the catch-basin, as when the concentrates are being discharged from the drum 1, as hereinafter described, and, secondly, when the lower opening 22 is closed by the valve 23 and the openings 24 adjusted by means of the door-valves 25 to the proper degree the tailings will be discharged therefrom continuously, as hereinafter described, the concentrates remaining within the drum 1. The discharge from the opening 22 falls into a chute 26, whence it is directed into either of two underlying inclined chutes 27. The said opening 22 may be closed or opened to any required extent by the valve 23, hereinbefore referred to. Said valve is carried by arms 23$^b$, pivotally suspended from studs 23$^a$, projecting from the sides of the catch-basin 20. One of said arms is provided with a segmentally-slotted portion 23$^c$, through the slot of which passes a set-bolt 23$^d$, projecting from the side of the catch-basin 20. By means of this slot and set-bolt the valve 23 may be secured in any position of adjustment, according to the amount of discharge to be allowed to escape from the opening 22. When said valve is not used to close or partially close the opening 22, it is pushed back on its pivots until a lug or projection 28 thereon is caught by a gravity catch or pawl 29, pivoted to the catch-basin 20. The discharge from either of the openings 24 (one of which is shown) is also directed into chute 26 and thence into chute 27 by suitable chutes 30, (one of which is shown.)

Figure 3:
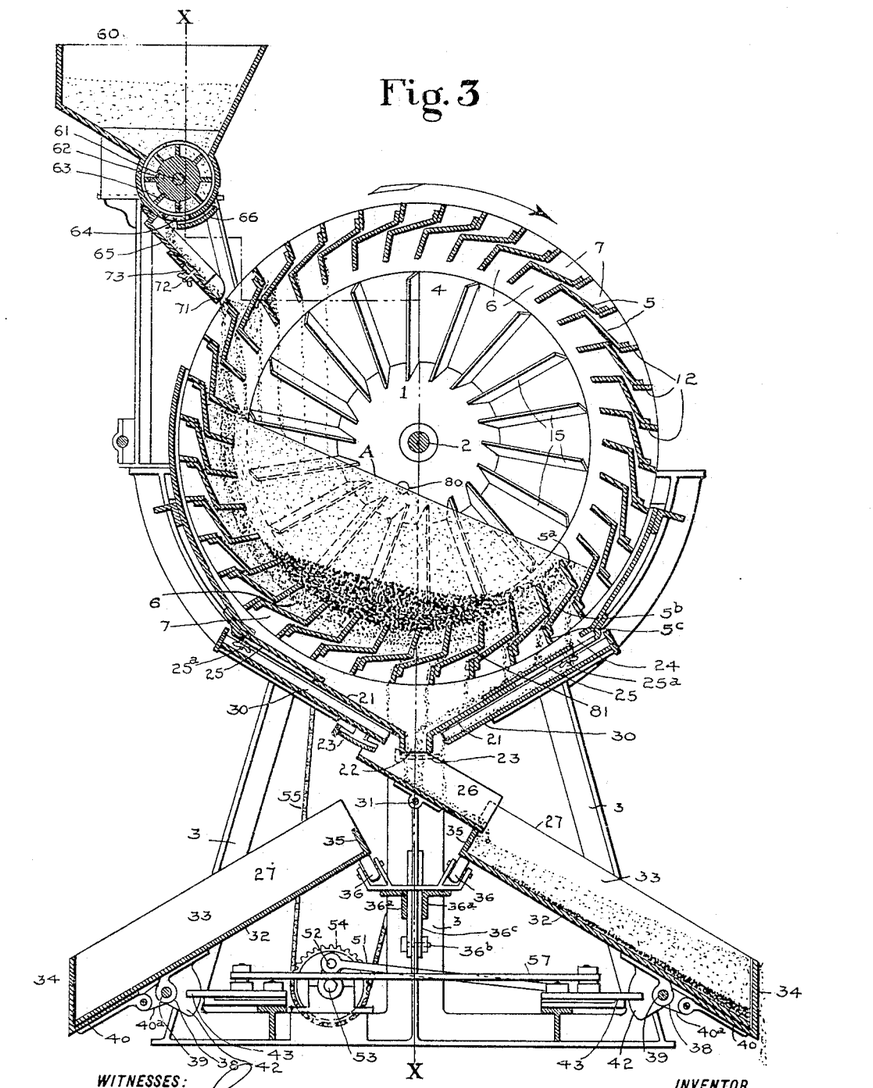
Fig. 3 is a vertical section on line Y Y, Fig. 2, showing the apparatus as in operation separating the material.
Figure 4:
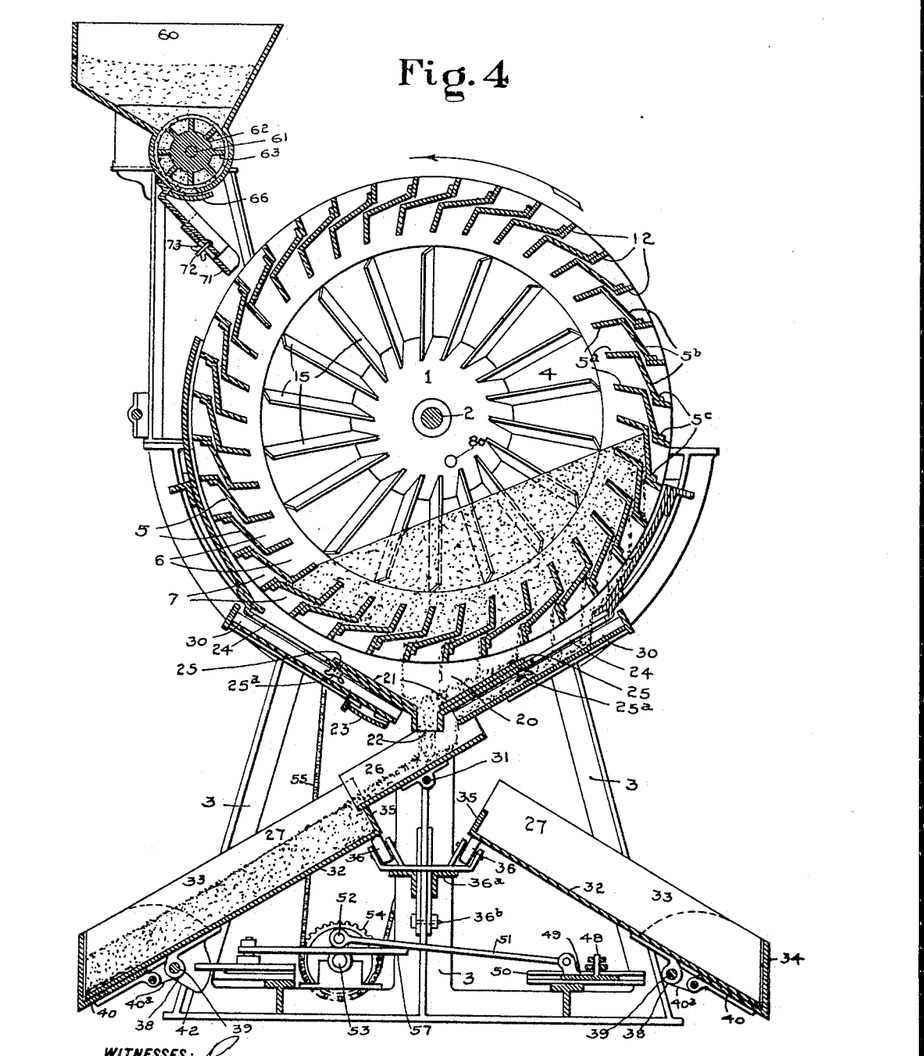
Fig. 4 is a view similar to Fig. 3, but showing the apparatus discharging the material therefrom.
Figure 5:
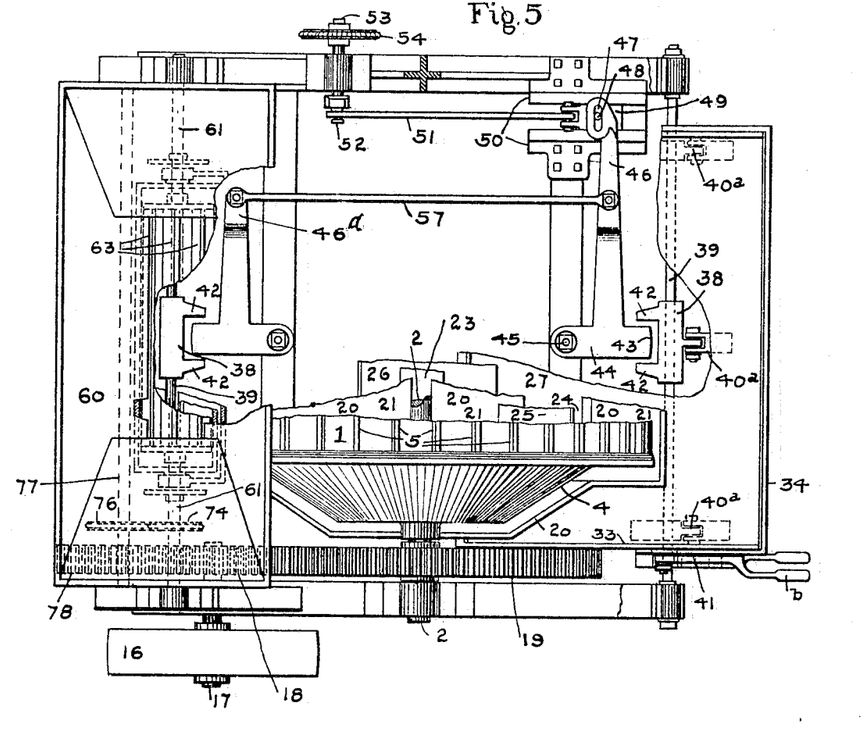
Fig. 5 is a plan view of the apparatus, parts thereof being broken away for perspicuity.

The chute 26 is pivotally mounted upon a shaft 31, so that said chute may be swung into position with either end upwardly directed under the catch-basin 20 and its other or lower end directed into either of the chutes 27, as may be desired, according to which side of the machine it is desired to discharge the contents of the drum. Thus when the machine is discharging the tailings, as hereinafter described, the chute 26 may be brought to discharge into the chute on the right of Fig. 3 and when discharging the concentrates into the chute 27 on the left of said Fig. 3, as seen in Fig. 4, thus keeping the concentrates and tailings in separate receptacles.

Figure 1:
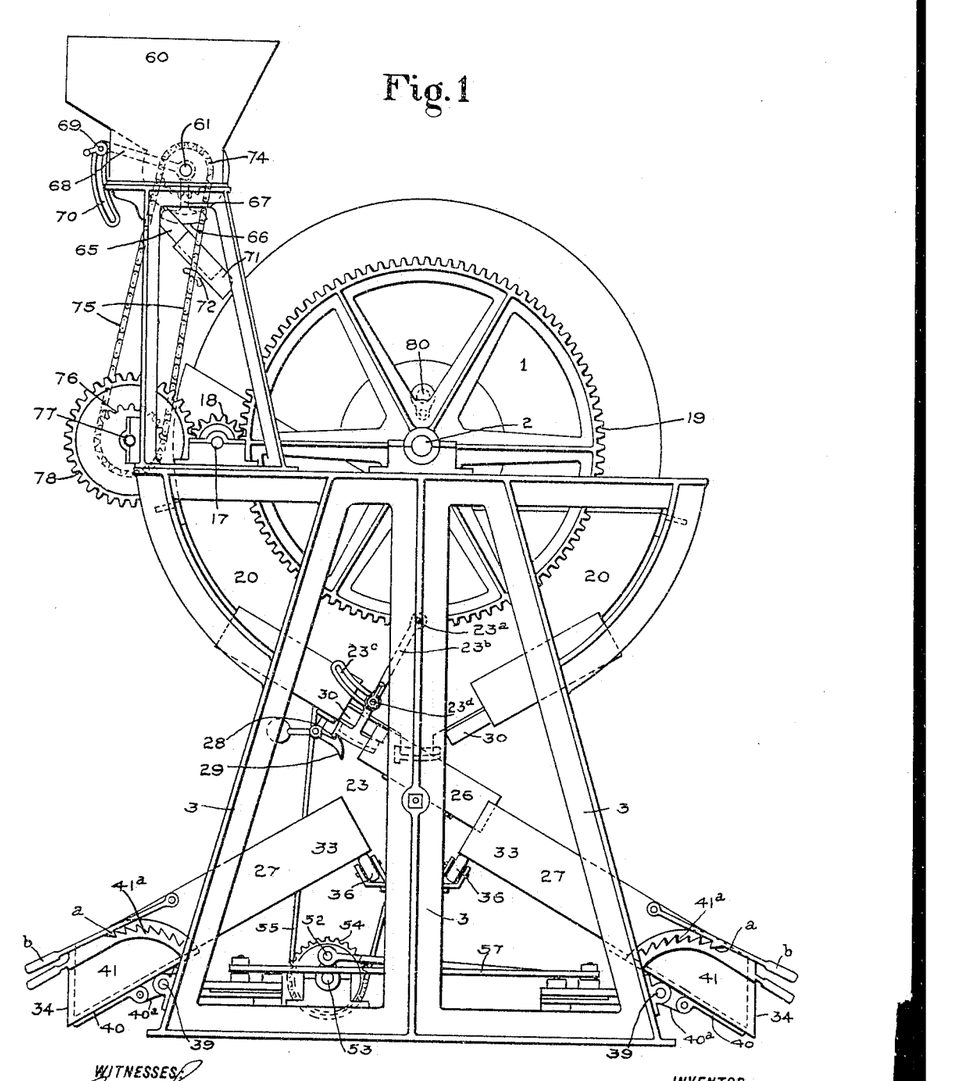
Figure 1 is a side elevation.
Figure 2:
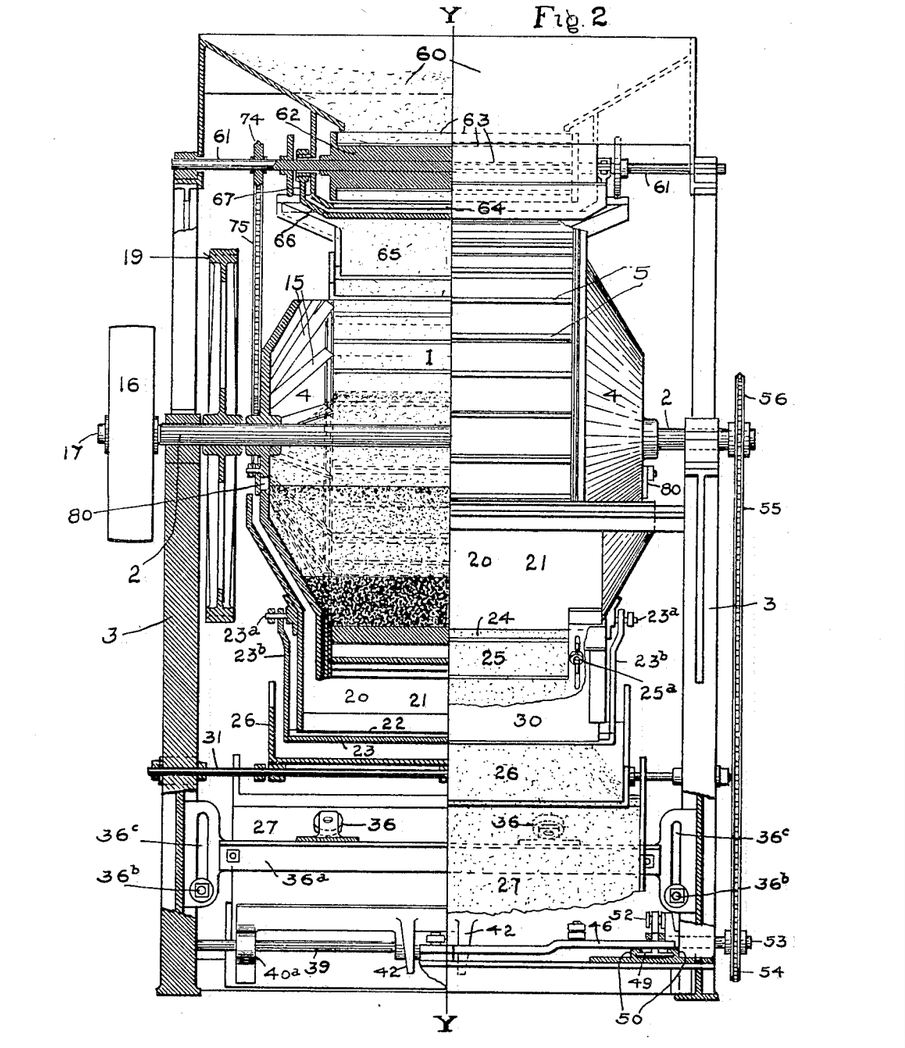
Fig. 2 is an end elevation taken from the side on which the feed-hopper is located and part of the apparatus being shown in section, as on line X X, Fig. 3.

The chutes 27 are identical in construction, so I shall describe but one thereof, as follows: Said chute 27 is provided with a bottom 32, sides 33, and a lower upwardly-projecting end 34, thus forming an inclined open box or bin like structure. It is also provided with a slightly-elevated upper edge 35, upon which the under side of the chute 26 is adapted to rest. The upper end of chute 27 rests upon and is supported by a roller or rollers 36, journaled in a frame 36$^a$, which frame extends laterally across the machine and is secured to the standards 3 by set-bolts 36$^b$, passing through the vertical slots 36$^c$ in said frame, whereby said frame and rollers (and thereby the upper end of the chute 27) may be adjusted vertically as may be required to regulate the angle of the material within said chute 27. The rollers 36 are journaled in such relation to the chute, as seen, as to permit the latter to be reciprocated laterally, as and for a purpose hereinafter appearing. At its lower forward end the chute is connected with sleeves 38, loosely mounted on a shaft or rod 39, secured to the machine-frame, which shaft while supporting the lower end of said chute permits the same to be laterally reciprocated thereon. The lower forward end of the chute 27 is made adjustable, so as to regulate the discharge of the material over the forward edge 34 thereof in the following manner: The said forward lower end 34 is secured to or may be an integral part of an auxiliary bottom piece 40 and to side pieces 41. One of these side pieces 41 is provided with a segment provided with teeth 41$^a$, Fig. 1, that may be engaged by a tooth $a$ of an arm $b$, pivotally secured to the side 33 of the chute. The auxiliary bottom piece 40 is connected by a link 40ᵃ to the shaft 39. When the tooth *a* of the arm *b* is disengaged from the engagement with a tooth of the segment, the lower forward end piece 34 and the said auxiliary bottom piece 40 may be lowered or elevated, as desired, thus regulating the discharge from the chute or the thickness of the material in the chute. When the proper degree of adjustment is secured, the tooth *a* of arm *b* is again caused to engage a tooth 41ᵃ of the segment.

Engaging a bifurcation 42 of one of the sleeves 38 is an arm 43 of a lever 44, pivoted, as 45, to the machine-frame. This lever has projecting therefrom an arm 46, whose other end is provided with a longitudinal slot 47, that is engaged by a vertical pin 48, projecting upwardly from a slide-head 49, adapted to slide in guideways 50 of the machine-frame. This slide-head 49 is pivotally connected to a rod 51, which is eccentrically pivoted at 52 to a shaft 53, that carries on its outer end a sprocket-wheel 54, that is connected by suitable driving mechanism, such as a chain 55, with a sprocket-wheel 56, carried by the shaft 2. The arm 46 for the chute mechanism on the one side is connected by a rod 57 to the corresponding arm 46ᵃ of the chute mechanism on the opposite side, only one of said arms, 46, being connected with the slide-head 49 and driving mechanism. Thereby the motion imparted to one of said arms 46 is transferred also to the other arm 46ᵃ, and thus to the chutes 27, as hereinafter set forth.

Somewhat at one side and above the drum 1 is mounted upon the machine-frame a feed-hopper 60. In the lower end of this feed-hopper is journaled on a shaft 61 a feed-roller 62. This roller is provided with paddle-like projections 63, forming pockets therebetween that are adapted to be successively as the said roller is rotated into registry with a discharge-opening in the bottom of the hopper, (marked 64,) and thereby discharge the contents of said pockets through said opening, whence the material drops onto an incline directing-chute 65 and is thence directed into the outer pocket 7 of the drum 1, that is in line therewith as the said drum is rotated. The size of the opening 64, and consequently the amount of discharge therefrom, may be regulated by a swinging door or valve 66, which is pivotally hung from said shaft 61, being suspended by arms 67. As a ready means for conveniently manipulating said door I provide the following mechanism: Projecting from and secured to one of said arms 67 is an arm 68, having at its free end a set-bolt 69, engaging a slotted sector 70, fixed to the hopper-frame and whose slot is concentric with shaft 61. When it is desired to close or open said door 66, the set-bolt 69 is loosened, and the movement of the arm 68 causes a corresponding change of position of the arms 67, and so of the door-valve 66, and when the desired position of adjustment is attained the set-bolt is again tightened, securing the arm 68 to the sector 70. The free or discharge end of the chute 65 may be shortened or extended by means of an extension-plate 71, adjustably secured to the under side thereof by means of a set-bolt 72 passing through a slot 73 in said plate 71.

The feed-roller shaft 61 is suitably driven in the following manner: On said shaft is a sprocket-wheel 74, that is driven through the medium of a chain 75 from a sprocket-wheel 76, mounted on a shaft 77, to which latter shaft power is communicated through the medium of the aforementioned gear 18 on shaft 17 and a gear 78, meshing therewith and carried by shaft 77.

Having now described the construction of the invention, except certain minor details hereinafter referred to, I shall proceed to explain the mode of operation thereof, as follows: The driving-shaft 17 being set in motion from the source of power, the drum 1 is through the described mechanism rotated in the direction of the arrow in Fig. 3. At the same time (the door 66 being open or partially so) the feed-roller 62 in the hopper is rotated, thus feeding the directing-chute 65 into the ascending outer pocket 7 of the drum-periphery, as indicated in Fig. 3. The valves 23 and 25, respectively, are set in the closed position, closing the openings 22 and 24 in the catch-basin 20, or it may be that either or both of the openings 24 may be left open or partially open for a purpose hereinafter explained. The material fed into the outer pockets 7 of the drum will pass therethrough into the inner pockets 6 and thence into the interior of the drum until the latter is filled to the line A, (indicated in Fig. 3,) which will be indicated to the operator either by material escaping through a peep-hole 80, provided for that purpose, or through the openings 24, if the same be left open. The drum having thus been filled, (it being understood that the catch-basin is of course also filled with the material at this time, and so supporting, as it were, the material in the drum,) the valve 23 is opened to allow the material in the catch-basin to escape into the chute 26, whence it is directed to one of the chutes 27 and removed. The operation being continued, the real operation of the device to effect the useful result is begun—to wit: The base material falling from the pockets 6 onto the top of the inclined body of material in the drum 1, the particles of heavier specific gravity (being the precious metals to be recovered) will tend to work their way down through the mass according to the laws of gravitation, while the lighter material will work down the inclined surface of the mass until finally the latter will enter the inner pockets 6 of the drum 1, that are passing the lower end of said inclined surface.

These particles will fill said inner pockets 6 and will be gradually discharged therefrom into the outer pockets 7 through the constricted passage-ways, (marked 81 in Figs. 3 and 6,) whence said particles will be discharged into the catch-basin 20, thence into chute 26, and so into the chute 27, that is in line with the latter. The discharge from the inner to the outer pockets of the drum-periphery will, however, cease as soon as the elevation of the forward or outer end of the limb $5^b$ is such as to bring the mass of particles in said pockets 6 and 7 to a state of equilibrium—that is, when the surface of the sand within said pockets extending between the lower end of the limb $5^a$ of the forward side of a pocket and the outer end of the limb $5^b$ of the rear side of the pocket forms an angle with the horizontal of less than the angle of equilibrium of the sand being treated, usually from twenty-one to forty-one degrees. As the discharge from the outer pockets 7 of the sand or tailings is very slight at the points beneath and adjacent to the vertical center line of the drum, (at which point the heavier particles to be recovered are congregated, as seen in Fig. 3,) there will be very little tendency for the latter to enter the pockets 6, and even if such particles should so enter the same they could not be discharged from the exterior pockets 7, because the exit from the latter would be shut off by the arrival of the particles at a state of equilibrium, as before described. However, a much larger proportion of the sand particles will be discharged from the pockets 7 at points forward of the center line, as indicated at the right in Fig. 3, in which the sand—that is, the tailings—is flowing quite freely from the two pockets 7 on that side. Thus the tailings are being discharged from the drum, while the concentrates—that is, the heavier particles of precious metal—are retained therein. As the bars 5 move forward and upward after the discharge from the pockets 7 thereof has ceased they will carry up the sand contained therein until the surface A of the mass is reached, when the said sand is discharged back again into the interior of the drum and again follows the laws of flowing sand. The mass of the material within the drum 1 is kept in constant motion—that is, is being constantly disturbed by the inclined radial fins or blades 15 in the conical end portions 4 of the drum—which materially assists the particles composing the mass in seeking their equilibrium and relative positions in the mass. Said conical end sections 4 also serve to provide a much greater surface area to the mass of material within drum 1, in traveling down which inclined area the material will have lateral as well as direct downward movement toward the discharge. The tailings as they descend from chute 26 into chute 27 may still contain some small proportion of precious metal, and in order to still further concentrate the same they are caused to assume in said chute 27 the position seen in Fig. 3—that is, they will assume an incline in accordance with the laws of flowing sand—and as said chute is reciprocated by the lever 44, which is actuated through the before-described mechanism and engages the sleeve 38 on shaft 39, said tailings within said chute are jarred back and forth and any heavier particles will gradually settle to the bottom, as indicated, and the lighter particles or waste material will be discharged over the forward edge 34. The effect of the continuous rotation of the drum 1 upon the mass of material contained therein is to continuously disturb the center of gravity of said material by raising the mass of said material above its angle of equilibrium, thus causing the particles of the upper strata to seek to establish the equilibrium of the mass by the particles of the lighter specific gravity—that is, the worthless particles or tailings—freely moving down the inclined upper strata without material penetration thereof and the particles of heavier specific gravity—that is, the metallic particles—penetrating the mass of material, and so being forced to the lower strata. The force diagram, Fig. 8, indicates the relative path taken by the various materials of equal volume when acted upon by the drum 1 in the manner above described. When the apparatus has been run until the concentrates—that is, the heavy metallic particles—begin to discharge from the openings 24, the drum is emptied by simply reversing its direction of rotation, whereupon the mass of material will be reversed to the other side of the drum and will be discharged rapidly from the pockets 7, as seen in Fig. 4. Of course before beginning to discharge the concentrated material from drum 1 the valve-door 66, controlling the feed-hopper, is closed, so that material ceases to be fed into the drum 1.

I do not wish to be understood as limiting myself to the employment of the precise construction shown, as it is obvious that many modifications may be made therein without departing from the essential principles of the invention.

Having thus described my invention, I claim as new and desire to secure by Letters Patent—

1. In an apparatus of the character recited, the combination of the horizontally-revoluble drum, the periphery of which consists of a series of spaced bars, forming interior and exterior pockets, together with means for feeding material to the exterior pockets as the same ascend in the rotation of the drum, substantially as set forth.

2. In an apparatus of the character recited, the combination of the horizontally-revoluble drum, provided with the conical end portions, and the central cylindrical portion, the interior and exterior communicating pockets, forming the periphery of said cylindrical portion of said drum, together with means for supplying material to the exterior pockets in their ascent of rotation, substantially as set forth.

3. In an apparatus of the character recited, the combination of the horizontally-revoluble drum, provided with conical end portions, the inclined radial blades on the interior of said conical end portions, the central cylindrical portion of said drum being provided with peripheral interior and exterior communicating pockets, and means for supplying material to said exterior pockets, substantially as set forth.

4. In an apparatus of the character recited, the combination of the horizontally-revoluble drum, provided with peripheral interior and exterior communicating pockets, the slip-tongue or valve for adjusting the size of the opening of passage-way between the said interior and exterior pockets, and means for providing material to said exterior pockets, substantially as set forth.

5. In an apparatus of the character recited, the combination of the horizontally-revoluble drum, means for supplying material thereinto adjacent to the upper part thereof, together with means for continuously disturbing and raising the center of gravity of the mass of material within said drum, peripheral interior and exterior communicating pockets, arranged to remove the lighter waste material from the upper strata of the mass of material within said drum to the exterior of said drum, whereby is formed a moving strata of waste material beneath the said mass of material within said drum and the concentrates retained therein, substantially as set forth.

6. In an apparatus of the character recited, the combination of the horizontally-revoluble drum, provided with the interior and exterior communicating pockets, the catch-basin, provided with an outlet, inclosing the lower portion of the periphery of said drum, and means for supplying material to the said exterior pockets of said drum as the same ascend in the rotation of the drum, substantially as set forth.

7. In an apparatus of the character recited, the combination of the horizontally-revoluble drum, provided with the peripheral interior and exterior communicating pockets, means for supplying material to said exterior pockets as the same ascend in the rotation of the drum, the catch-basin inclosing the lower portion of said drum, and provided with an exit-opening, the directing-chute for receiving the discharge from said catch-basin, together with chutes into either of which the discharge from said directing-chute is adapted to be made, substantially as set forth.

8. In an apparatus of the character recited, the combination of the horizontally-revoluble drum, provided with the peripheral interior and exterior communicating pockets, means for supplying material to said exterior pockets as the same ascend in the rotation of the drum, the catch-basin inclosing the lower portion of said drum, and provided with an exit-opening, the directing-chute for receiving the discharge from said catch-basin, together with the chutes into either of which the discharge from said directing-chute is adapted to be made, and means for laterally reciprocating the last-mentioned chutes, substantially as set forth.

9. In an apparatus of the character recited, the horizontally-revoluble drum, provided with peripheral interior and exterior pockets communicating with each other, the catch-basin inclosing the lower portion of said drum, said catch-basin being provided with an exit-opening at its lower end and with two additional exit-openings above its lower end, one thereof, each side of the latter, and means for supplying material to said drum adjacent to the upper portion thereof, substantially as set forth.

10. In an apparatus of the character recited, the combination of the horizontally-revoluble drum, provided with the peripheral interior and exterior communicating pockets, means for supplying material to said exterior pockets as the same ascend in the rotation of the drum, the catch-basin inclosing the lower portion of said drum, and provided with exit-openings in the bottom thereof, the directing-chute for receiving the discharge from said catch-basin, the chutes into either of which the discharge from said directing-chute is adapted to be made, together with means for adjusting the angle of the inclination of the last-mentioned chutes, substantially as set forth.

11. In an apparatus of the character recited, the combination of the horizontally-revoluble drum, provided with the cylindrical portion whose periphery is composed of the interior and exterior communicating pockets, and also provided with conical end portions, the feed-hopper, the feed-roller rotatably journaled in the lower portion thereof, and provided with feed-pockets, the adjustable valve for regulating the discharge from said hopper, together with the directing-chute for directing the material fed from said hopper into the ascending exterior pockets of said drum, successively, substantially as set forth.

12. In an apparatus of the character recited, the combination of the horizontally-revoluble drum, provided with peripheral interior and exterior communicating pockets, the adjustable pocket-valve, the catch-basin inclosing the lower portion of said drum, said catch-basin being provided with an exit-opening at its lower end and with two additional exit-openings above its lower end, one thereof each side of the latter, the adjustable valves for regulating the size of said openings, respectively, together with the chutes directing the discharge from the latter openings toward the lower end of said catch-basin, respectively, and together with means for supplying material to the upper portion of said drum, substantially as set forth.

13. In an apparatus of the character recited, the combination of the horizontally-revoluble drum, provided with the peripheral interior and exterior communicating pockets, means for supplying material to said exterior pockets as the same ascend in the rotation of the drum, the catch-basin inclosing the lower portion of said drum, and provided with an exit-opening, the directing-chute for receiving the discharge from said catch-basin, together with the chutes into either of which the discharge from said directing-chute is adapted to be made, and means for adjusting the lower forward end of said latter chutes for regulating the thickness of the bed of material therein and means for supplying material to said drum adjacent to the upper portion thereof, substantially as set forth.

14. In an apparatus of the character recited, the combination of the horizontally-revoluble drum, provided with the conical end portions, and the central cylindrical portion, the interior and exterior communicating pockets, forming the periphery of said cylindrical portion of said drum, means for supplying material to the exterior pockets in their ascent of rotation, together with the overflow-opening leading from said conical end portions, substantially as and for the purpose set forth.

In testimony whereof I have hereunto affixed my signature this 31st day of July, A.D. 1903.

GEORGE H. FETTUS.

Witnesses:
    ROBT. KIRKPATRICK,
    WM. B. RIEBCUACK.